United States Patent
Kaneko

(10) Patent No.: US 8,035,868 B2
(45) Date of Patent: Oct. 11, 2011

(54) LIGHT SOURCE UNIT AND OBJECT READER

(75) Inventor: Ikuo Kaneko, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 634 days.

(21) Appl. No.: 12/178,195

(22) Filed: Jul. 23, 2008

(65) Prior Publication Data

US 2009/0027915 A1      Jan. 29, 2009

(30) Foreign Application Priority Data

Jul. 25, 2007   (JP) ................. 2007-193500

(51) Int. Cl.
*H04N 1/04*   (2006.01)
(52) U.S. Cl. ......... 358/475; 358/474; 358/484; 358/497
(58) Field of Classification Search .......... 358/475, 358/484, 509, 482, 483, 512–514, 497, 505, 358/474; 399/220, 221; 355/67, 71; 250/208.1, 250/578.1, 205, 552; 359/800, 806, 201.1, 359/201.2, 207.6
See application file for complete search history.

(56) References Cited

U.S. PATENT DOCUMENTS

| | | | | |
|---|---|---|---|---|
| 5,196,950 A | * | 3/1993 | Fukoka et al. | 358/475 |
| 5,357,099 A | * | 10/1994 | Tabata et al. | 250/208.1 |
| 6,266,163 B1 | | 7/2001 | Hirakawa | |
| 7,085,023 B2 | * | 8/2006 | Okamoto et al. | 358/471 |

FOREIGN PATENT DOCUMENTS

JP         11-27458         1/1999

* cited by examiner

*Primary Examiner* — Cheukfan Lee
(74) *Attorney, Agent, or Firm* — Kenealy Vaidya LLP

(57) ABSTRACT

A light source unit and reader can include a line light source that is attached to a radiator and a rod lens that is attached above the line light source. The radiator with the line light source and the rod lens attached thereto, and a linear strip-shaped reflector arranged in front of the rod lens, are housed in a carriage. The carriage is supported beneath a contact glass and movable in a direction normal to a longitudinal axis of the line light source. The lens has a section in a plane normal to a longitudinal axis of the lens, in which a surface of the lens facing the light source has a curved line that expands or is convexly facing toward the light source. The opposite surface of the lens from the light source has composite curves including a plurality of continuous curves with different radii of curvature. The composite curves are located on both sides of a plane containing the optical axis of the LED and expand or are convex in an opposite direction from the light source.

16 Claims, 4 Drawing Sheets

LIGHT SOURCE UNIT AND OBJECT READER

This application claims the priority benefit under 35 U.S.C. §119 of Japanese Patent Application No. 2007-193500 filed on Jul. 25, 2007, which is hereby incorporated in its entirety by reference.

BACKGROUND

1. Technical Field

The disclosed subject matter relates to a light source unit, and more particularly to a light source unit for reading objects in a reader, such as a scanner.

2. Description of the Related Art

In a conventional process for reading a document in a scanner with a shrinkage optical system or a contact optical system, a line-shaped scanning light having a certain width may be emitted or applied onto the document image. The reflected light or transmitted light is then image-formed on a line solid-state imaging device (line CCD) through an optical path including mirrors and lenses. The output signal from the line solid-state imaging device (line CCD) is processed to read the document image.

Among conventional devices, there has been proposed an irradiation optical system configured as shown in FIG. 7 to apply light emitted from a light source to a document image.

The system comprises a carriage 50, which houses a line light source 51 such as a halogen lamp and a reflector 52 arranged in the vicinity of the line light source 51. Direct light from the light source 51 and light emitted from the light source 51 and reflected at the reflector 52 are collected and, after transmission through a contact glass 53, applied to or incident on a document image 54. The light reflected at the document image 54 and transmitted through the contact glass 53 is guided via a mirror 55 similarly housed in the carriage 50 to an optical path reaching a line CCD (for example, see Japanese Patent document 11-27458A).

In the document image reading method configured above, the width of the line-shaped light that is applied onto the document image, falling within 20% the fluctuation of the amount of light, is determined to be 1.5 times or more the width of the image forming area in the line CCD. In this case, an error in accuracy of attachment of the optical moving part (carriage) and a displacement of the irradiated position due to vibrations when moving (scanning) may occur. Even in such a situation, it is possible to suppress the fluctuation of the amount of light on the document image within the image forming area in the line CCD.

In the above-described document image reading method, the light emitted from the light source is split into two optical paths: a first optical path and a second optical path. On the first optical path, the light transmits through the contact glass 53 directly and reaches the document image 54. On the second optical path, the light is reflected from the reflector 52 and the reflected light transmits through the contact glass 53 and reaches the document image 54.

In this case, a wide-directivity halogen lamp is used as the light source 51, and the reflector 52 is located in the vicinity of the light source 51 to improve the effect of collecting light. The amount of light traveling on the second optical path to the document image 54 is, however, less than the amount of light traveling on the first optical path to the document image 54.

The distribution of intensities of illumination in the direction of movement (sub-scan direction) in a width dimension of the line-shaped light that is applied onto the document image 54 therefore becomes uneven and causes variations in reading the document image 54.

The wide-directivity light source provides a large amount of light that can not contribute to reading the document image 54 (i.e., there is an inherent loss in light) and the light from the light source can not be utilized sufficiently. The use of LED light sources having an extremely lower amount of total light beams as compared to the halogen lamp to achieve an amount of illuminating light equal to the halogen lamp requires a large number of LED light sources.

To solve such a problem, two halogen lamps may be provided in parallel beneath the contact glass to apply symmetrical light sources from both the halogen lamps to a document image above the contact glass, thereby achieving an excellent distribution of intensities of illumination with the illuminating light.

In this case, an optically excellent distribution of intensities of illumination can be obtained. However, the use of two halogen lamps in the light source increases the material expense and size and causes an increase in production costs.

The disclosed subject matter has been made in consideration of the above and other problems and can be configured to provide a light source unit for reading documents at low cost, while excellent in utilization of light, with a higher intensity of illumination of document images, and being capable of applying a light with an excellent distribution of intensities of illumination while taking up a small amount of space.

SUMMARY

In an effort to solve the above and other problems and to address certain issues in the conventional art, the disclosed subject matter includes a light source unit for reading documents or other objects. The light source applies light to a document surface and receives the light reflected from the document surface to read the document. The light source unit can include: a line light source; a rod lens located substantially in parallel with the line light source and having a first optical-axis plane and a second optical-axis plane, the first optical-axis plane containing a plurality of optical axes passing through a first linear line focus group containing a plurality of first focuses, the second optical-axis plane containing a plurality of optical axes passing through a second linear line focus group containing a plurality of second focuses; and a linear reflector located on the opposite side of the rod lens from the line light source substantially in parallel with the rod lens at a position crossing the second optical-axis plane of the rod lens. The first linear line focus group and the second linear line focus group can be located in substantially at a position where the second optical-axis plane reflected from the linear reflector crosses the first optical-axis plane.

The first optical-axis plane and the second optical-axis plane reflected from the linear reflector can be configured to cross at an angle of 80°-100°.

The first linear line focus group can be located at a distance of 2-5 mm from the second linear line focus group.

The rod lens can have surfaces on the side facing the line light source and the opposite side when sectioned along a plane normal to the longitudinal direction of the rod lens, the surfaces can have sectional shapes of composite curves including a plurality of continuous curves with different radii of curvature, the composite curves located on both sides of a third optical axis of the line light source passing through the rod lens and expanded in the opposite directions from the line light source, wherein the composite curves have a link therebetween, which is a straight line in parallel with the third optical axis.

The first optical-axis plane and the second optical-axis plane before reflection from the linear reflector can be configured to form an angle of 40° with respect to each other.

The line light source can include a plurality of white LEDs that are linearly arrayed.

The light source unit for reading documents can be movably attached to the document reader in the direction normal to the longitudinal direction of the line light source while the first optical-axis plane of the rod lens and the second optical-axis plane reflected from the linear reflector keep an angle of 40-50° from the normal plane to the document surface.

The rod lens can include light exit surfaces for guiding the light emitted from the line light source. The light exit surfaces can have sectional shapes of composite curves including a plurality of continuous curves with different radii of curvature. The composite curves are located on both sides of a plane containing the optical axis X of the line light source and expanded in the opposite directions from the line light source.

As a result, the distribution of intensities of illumination is made uniform within a focal region on a document surface.

In addition, the composite curves on both sides of the plane containing the optical axis X have a link therebetween, which is a straight line in parallel with the plane containing the optical axis X of an LED.

As a result, the light source can be configured to have a smaller loss in light guided through the lens, a higher utilization of light, and a larger amount of light applied to the document surface.

Two optical axes of the lens form an angle of 40°, and the normal to the document surface and one optical axis form an angle of 45° on attachment to the document reader.

As a result, in a line CCD for sensing the light reflected from the document surface, the sensed amount of noise light is smaller than the read light. Accordingly, the light source unit can be realized with a higher S/N ratio.

The optimization of the shape of the rod lens can be realized through a low-cost method and provide certain advantages and improvements.

DETAILED DESCRIPTION OF EXEMPLARY EMBODIMENTS

Figure 1:
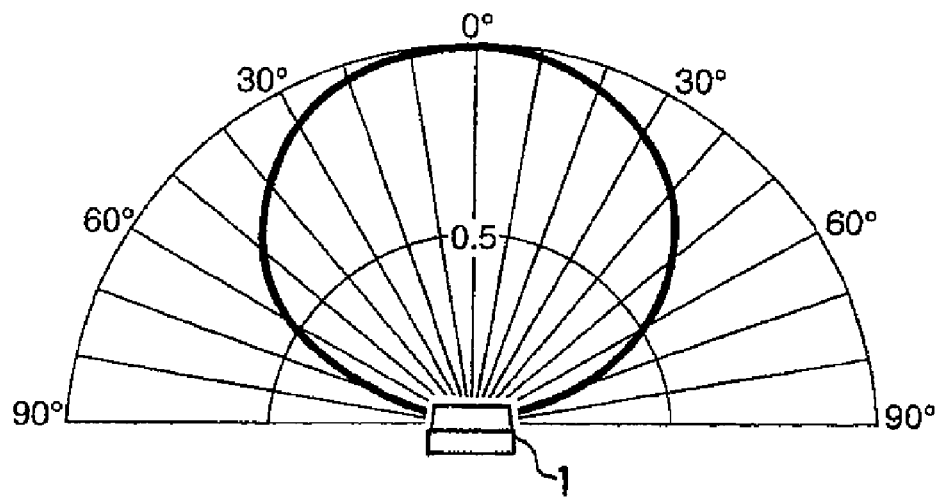
FIG. 1 is a graph showing the directivity of an LED contained in a line light source that can be used in an embodiment of the disclosed subject matter.

Certain exemplary embodiments of the disclosed subject matter will now be described in detail with reference to FIGS. 1-6 (with the same reference numerals denoting the same or similar elements). The below-described embodiments are suitable specific examples of the disclosed subject matter and include various technical features. The scope of the disclosed subject matter is, though, not limited to these embodiments.

An example of a light source unit of the disclosed subject matter can include a line light source including a plurality of LEDs arranged in line. Each of the LEDs is a white LED that emits light having a spectrum including wavelength components of red, green and blue light contained in three primary colors of light.

A blue LED element (chip) operative to emit blue light may be used as a light-emitting source. In this case, a specific configuration for the white LED comprises a blue LED element, a red fluorescent substance operative to provide a wavelength-converted red light when excited with the blue light, and a green fluorescent substance operative to provide a wavelength-converted green light when similarly excited with the blue light.

Thus, excitation of the red and green fluorescent substances with the blue light emitted from the blue LED element can produce a white light through additive mixture of the wavelength-converted red and green lights and the blue light emitted from the blue LED element.

A UV LED element (chip) operative to emit UV light may also be used as a light-emitting source. In this case, the white LED comprises a UV LED element, a red fluorescent substance operative to provide a wavelength-converted red light when excited with the UV light, a green fluorescent substance operative to provide a wavelength-converted green light when similarly excited with the UV light, and a blue fluorescent substance operative to provide a wavelength-converted blue light when similarly excited with the UV light.

Thus, excitation of the red, green and blue fluorescent substances with the UV light emitted from the UV LED element can produce a white light through additive mixture of the wavelength-converted red, green and blue light.

A red LED element (chip) operative to emit a red light, a green LED element (chip) operative to emit a green light and a blue LED element operative to emit a blue light may be used in combination as a light-emitting source. This case requires no fluorescent substance.

Thus, the red, green and blue lights emitted from the red, green and blue LED elements can produce a white light through additive mixture thereof.

A white LED may comprise a blue LED element (chip) operative to emit blue light used as a light-emitting source, and a yellow fluorescent substance operative to provide a wavelength-converted yellow light when excited with the blue light. In this case, the white light includes wavelength components of red and green light. Accordingly, this configuration is also available.

In any one of the above configurations, the white LED 1 has a half intensity angle of about 120° in general if no condensing means such as a lens is used (see FIG. 1).

Figure 2:
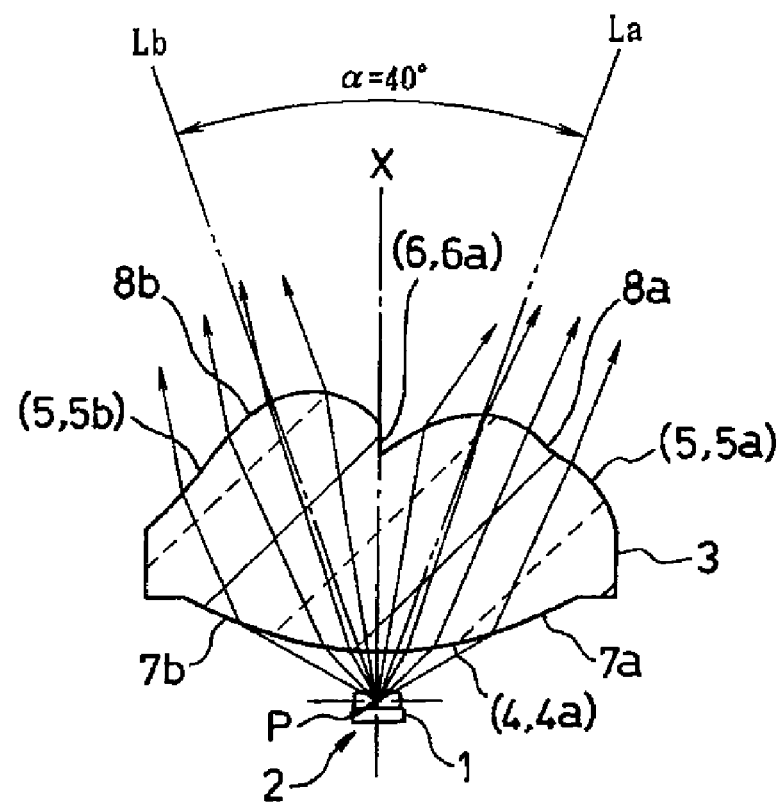
FIG. 2 is a cross-sectional view showing a relation between an embodiment of a line light source and a rod lens made in accordance with principles of the disclosed subject matter.

As shown in the cross-sectional view of FIG. 2, the lamp can include a line light source of LEDs (hereinafter abbreviated to "light source") 2. On the optical axis X of each of LEDs 1 (hereinafter abbreviated to "optical axis X") contained in the light source, a rod lens (hereinafter abbreviated to "lens") 3 is provided substantially in parallel with the light source 2 (e.g., almost in parallel or exactly in parallel with the light source 2).

The lens 3 exhibits the following shape when sectioned in a plane normal to the longitudinal direction of the lens 3. A surface 4 of the lens 3 facing the light source 2 in section has a curved line 4a that convexly expands toward the light source 2. The opposite surface 5 of the lens from the light source 2 in section has composite curves 5a, 5b including a plurality of continuous curves with different radii of curvature. The composite curves 5a, 5b are respectively located on either side of a plane containing the optical axis X and each convexly expands in a direction opposite from the light source 2. The composite curves 5a, 5b on both sides of the plane containing the optical axis X have a link surface 6 therebetween. The link surface in the embodiment is a plane substantially in parallel with the plane containing the optical axis X (a straight line 6a in parallel with the plane containing the optical axis X as a sectional shape).

The light emitted from the LED 1 travels toward a surface on one side of the optical axis X, the surface being a portion of the surface 4 of the lens 3 facing the light source 2 (hereinafter referred to as a light entry surface 7a). The light is then refracted at the light entry surface 7a and travels toward a surface on the same side of the optical axis X as the light entry surface 7a but in the opposite surface 5 of the lens 3 away from the light source 2 (hereinafter referred to as a light exit surface 8a).

Similarly, the light emitted from the LED 1 that travels toward an other surface on the other side of the optical axis X, the other surface being another portion of the surface 4 of the lens 3 facing the light source 2 (hereinafter referred to as light entry surface 7b). The light is then refracted at the light entry surface 7b and travels toward another surface on the same side of the optical axis X as the light entry surface 7b but in the opposite surface 5 of the lens 3 away from the light source 2 (hereinafter referred to as light exit surface 8b).

The light traveling from the light entry surfaces 7a, 7b to the light exit surfaces 8a, 8b of the lens 3 is guided through the lens 3 and reaches the light exit surfaces 8a, 8b. The light is then refracted at the light exit surfaces 8a, 8b and released to an area outside of the lens 3. The light exit surfaces 8a, 8b located on both sides of the optical axis X of the lens 3 are shaped to condense the received light in certain directions when released to the outside. Desirably, the directions of condensation are determined along optical axes La and Lb on respective sides of the optical axis X of the LED 1, which pass through a light-emitting point P of the LED 1 and intersect at an angle α of 40°. A plurality of sequentially or continuously formed composite curves 5a, and 5b are formed along a longitudinal axis of the rod lens 3 and are positioned to correspond to each of the plurality of light sources, such as LEDs 1, located along the longitudinal axis of the line light source 2.

The angle of intersection, α, may be finely adjusted to about 40° to satisfy an optical characteristic with respect to the contact glass described later.

The link surface 6 between the light exit surfaces 8a, 8b of the lens 3 is a plane formed substantially in parallel with the plane containing the optical axis X. The light that is emitted from the LED 1 into the lens 3, and is then guided through the lens 3 and received at a position in the vicinity of the link between the light exit surfaces 8a, 8b is released to an area outside of the lens 3 without substantial reflection (total reflection) at the link. Accordingly, the lens is shaped with a smaller loss in guided light.

Figure 3:
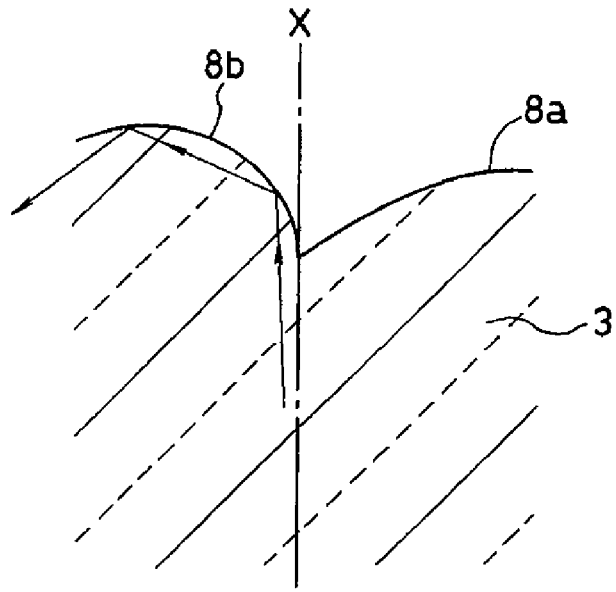
FIG. 3 is a partial cross-sectional view of the rod lens of FIG. 2.

In contrast, as shown in FIG. 3, the link surface between the light exit surfaces 8a, 8b of the lens 3 and the optical path of the received light may be configured to form an angle that is greater than a critical angle. In this case, the light is reflected (totally reflection) at the link, and the optical path thereof is deflected from a certain direction, resulting in a lens with a larger loss in guided light. In particular, the link between the light exit surfaces 8a, 8b in this case is a region with a larger density of beams of the received light. The loss in guided light in the link causes a high proportion of the total amount of light to diminish.

Figure 4:
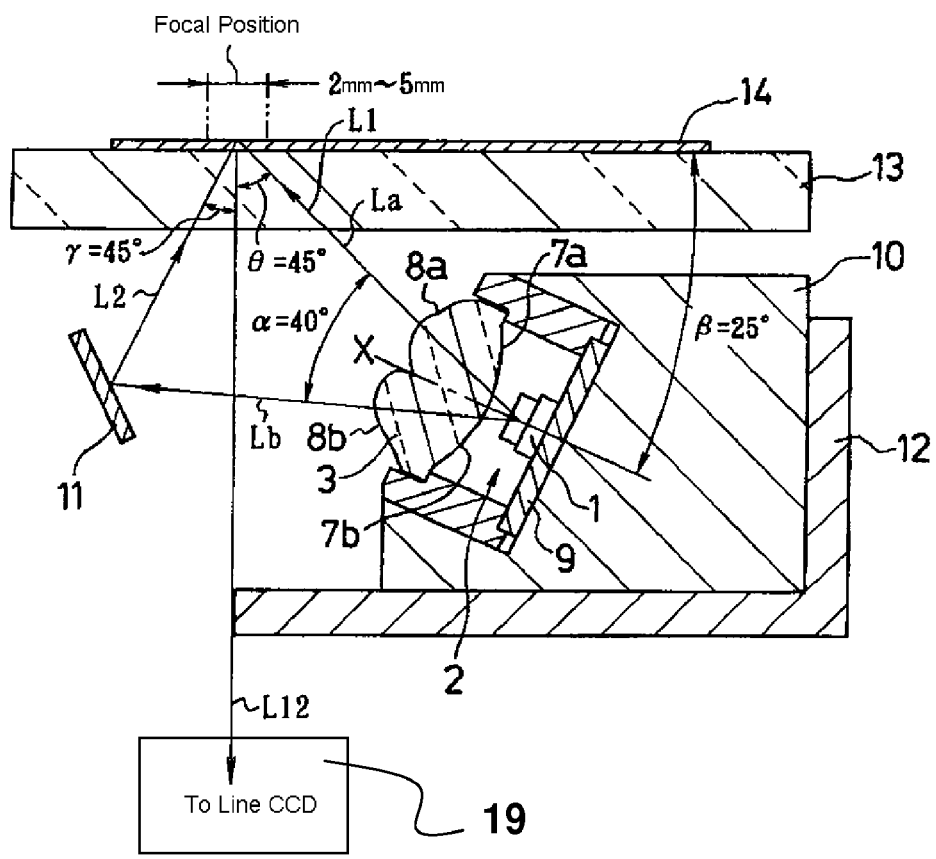
FIG. 4 is a partial cross sectional view of a copying/reading device including a line light source and a rod lens and made in accordance with principles of the disclosed subject matter.

As shown in a cross-sectional view of FIG. 4, each white LED 1 can be configured with a particular positional relation between the LED 1 and the rod lens 3. Specifically, plural white LEDs 1 are mounted on a substrate 9 in line to form the line light source 2, which is attached to a radiator 10 composed of an excellent-thermal conduction member such as a metal. The rod lens 3 is disposed above the line light source 2.

The radiator 10 with the light source 2 and the lens 3 attached thereto and the linear strip-shaped reflector 11 are housed in a carriage 12. It should be understood that each of the light source 2, lens 3 and reflector 11 extend in a longitudinal direction into the plane of the drawing shown in FIG. 4. The carriage is supported beneath the contact glass 13 in parallel with the surface of the contact glass 13 and movable in the direction normal to the longitudinal direction of the line light source 2. An object for copying or reading or observing, such as a document 14, can be placed on the contact glass 13. The radiator 10 with the light source 2 and the lens 3 attached thereto is set such that the optical axis X of the LED 1 and document 14 surface form an angle β of 25°. Of course, other objects that are conventionally known for scanning or copying can be used, such as passports, fingerprints, production pieces, circuit boards, substrates, etc.

In the above configuration, the light L1 emitted from the LED 1 enters the lens 3 through the light entry surface 7a located on the side of the optical axis X of the lens 3 closest to the contact glass 13. The light L1 is guided through the lens 3 and released outside of the lens 3 through the light exit surface 8a similarly located on the side of the optical axis X of the lens 3 closest to the contact glass 13. The light L1 then travels along an optical axis La through the contact glass 13 and focuses on the document 14 surface.

The light L2 emitted from the LED 1 enters the lens 3 through the light entry surface 7b located on the opposite side of the optical axis X of the lens 3 from the contact glass 13. The light L2 is guided through the lens 3 and released outside of the lens 3 through the light exit surface 8b similarly located on the opposite side of the optical axis X of the lens 3 from the contact glass 13. The light L2 then travels along an optical axis Lb and is reflected at the reflector 11 arranged along the optical axis Lb in the direction of travel. The reflected light transmits through the contact glass 13 and focuses on the document 14 surface. In this embodiment, the reflector 11 is described as being linear strip-shaped, that is, elongate flat plate-shaped. In place of this shape, it may be shaped linearly and recessed, that is, linear in the longitudinal direction and recessed in the direction orthogonal to the longitudinal direction. This may provide the reflector 11 with a function of condensing.

The direct light L1 emitted from the LED 1, which then travels along the optical path through the lens 3 and the contact glass 13 and focuses on the document 14 surface, and the reflected light L2 emitted from the LED 1, which then travels along the optical path through the lens 3, the reflector 11 and the contact glass 13 and focuses on the document 14 surface, are both applied in proximity on the document 14 surface. The reflected light L12 is detected via a read optical system 19 at a line CCD.

The direct light L1 and the reflected light L2 received at the document 14 surface have respective focal positions, which can be set within a range of 2-5 mm in parallel with the contact glass 13 surface and in the direction normal to the longitudinal direction of the line light source 2.

In the above configuration, the angle θ formed between the normal to the document 14 surface and the optical axis La is 45°. The angle θ is not limited to 45° but can fall within a range of 40-50°, for example. In such a case, as the angle α formed between the optical axis La and the optical axis Lb is 40°, the angle β formed between the optical axis X of the LED 1 and the document 14 surface falls within a range of 30-20°.

The position of the reflector 11 can be adjusted such that an angle γ formed between the light L2 reflected at the reflector 11 and the normal to the document 14 surface also falls within a range of 40-50° similar to the angle θ. This keeps the balance of the amount of light between the direct light and the reflected light focused on the document 14 surface and achieves a uniform distribution of intensities of illumination within the focal positions. This state can be ensured if both the angles θ and γ have the same value within a range of 40-50°.

Figure 5:
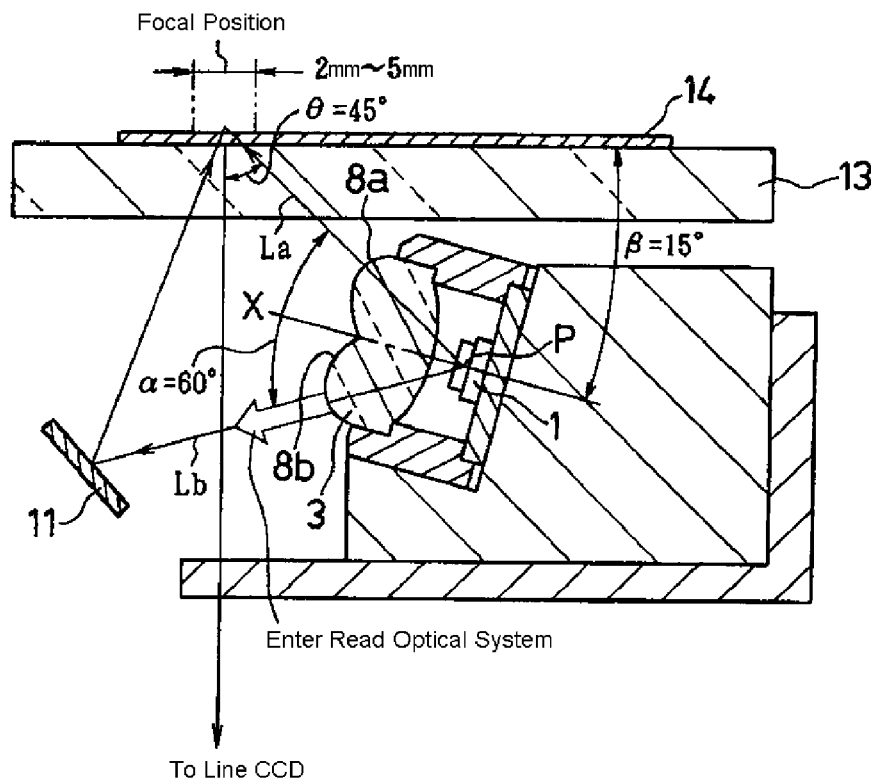
FIG. 5 is an illustrative partial cross sectional view of a comparative example of a copying/reading device including a line light source and a rod lens.

FIG. 5 shows a cross-sectional view of a comparative example of another copying/reading device. The comparison example can include the same or similar elements as those in the above-described embodiment of FIG. 4. The shapes of the light exit surfaces 8a, 8b of the lens 3, however, are changed. This difference sets the directions of condensation along the optical axes La and Lb that sandwich the optical axis X, pass through the light-emitting point P of the LED 1 and forms a wide angle α of 60°. The angle β formed between the optical axis X of the LED 1 and the document 14 surface can be set at 15° as another difference.

The above two differences make the angle α formed between the optical axes La and Lb wide and accordingly the optical axis Lb extends away from and is opposite in direction to the document 14. In this case, the light exiting from the lens 3 and traveling along the optical axis Lb enters the read optical system and becomes light noises other than the reflected light at the document 14 to lower the S/N ratio in the line CCD.

In this case, even if the angles θ formed between the normal to the document 14 surface and the optical axes La and Lb are adjusted within a range of 40-50°, and the angle β formed between the optical axis X of the LED 1 and the document 14 surface is made 20-10°, the above-described drawback or malfunction may still exist.

Figure 6:
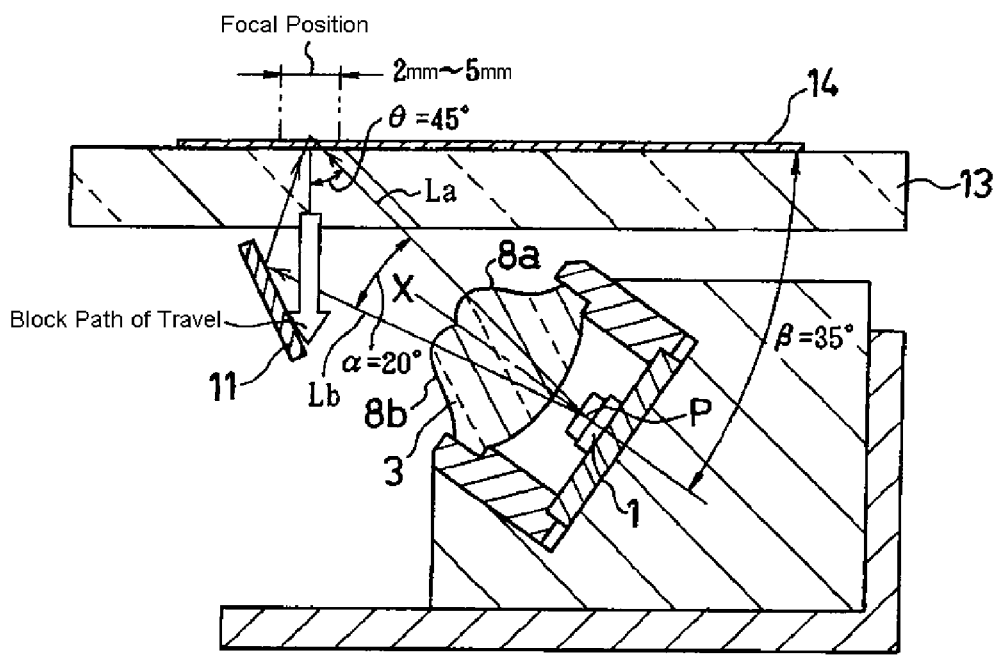
FIG. 6 is another illustrative partial cross sectional view of another comparative example of a copying/reading device including a line light source and a rod lens.
Figure 7:
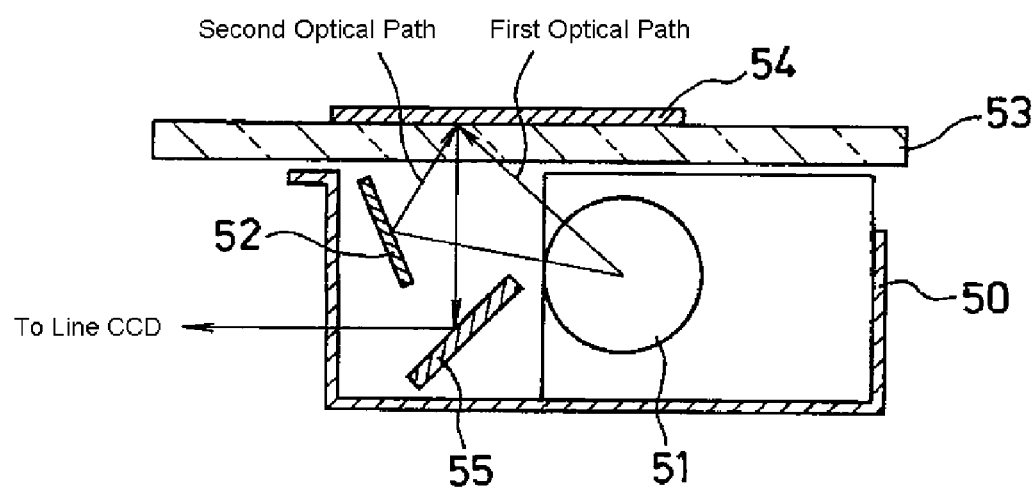
FIG. 7 is an illustrative cross-sectional view showing a conventional art device.

FIG. 6 is a cross-sectional view of another comparative example of a copying/reading device. This comparative example can include the same or similar elements as those in the above-described embodiments. The shapes of the light exit surfaces 8a, 8b of the lens 3 are, however, changed. This difference sets the directions of condensation along the optical axes La and Lb that sandwich the optical axis X, pass through the light-emitting point P of the LED 1 and forms a narrow angle α of 20°. The angle β formed between the optical axis X of the LED 1 and the document 14 surface can be set at 35° to provide another difference.

The above two differences make the angle α formed between the optical axes La and Lb narrow. Accordingly, the reflector 11 which operates to reflect the light which exits from the lens 3 and which travels along the optical axis Lb is required to be located near a position focusing on the document 14 surface. Therefore, the reflector 11 blocks the path of travel of light reflected at the document 14 surface and reduces the amount of light reflected at the document 14 surface and received at the read optical system, thereby lowering the signal levels detected in the line CCD. This case can also lower the S/N ratio, similar to the above comparative example of FIG. 5.

Also in this case, even if the angle θ formed between the normal to the document 14 surface and the condensing axis La is adjusted to be within a range of 40-50°, and the angle β formed between the optical axis X of the LED 1 and the document 14 surface is adjusted to be 40-30°, the problem and/or malfunction may be difficult to solve.

As described above, the rod lens has light exit surfaces for guiding the light emitted from the line light source which can include a plurality of LEDs arranged in line. The light exit surfaces can have sectional shapes of composite curves including a plurality of continuous curves with different radii of curvature. The composite curves 5a, 5b are located on either side of a plane containing the optical axis X of the LED and expand in a direction away from the light source (i.e., are convex surfaces as viewed from a light emitting direction). Accordingly, the light that is guided through the lens and received at the light exit surfaces 8a, 8b on both sides of the plane containing the optical axis X of the LED are condensed along the optical axes La, Lb.

As a result, the amount of light at two focuses on the optical axes La, Lb that are to be focused on the document surface are made almost equal, and the distribution of intensity of illumination is made uniform within the focal region on the document surface.

In addition, the link surface 6 between the composite curves 5a, 5b on either side of the plane containing the optical axis X is shaped in a plane substantially in parallel with the plane containing the optical axis X of the LED (a straight line in parallel with the plane containing the optical axis X as a sectional shape).

As a result, the light source unit can be configured with less loss in light guided through the lens, a higher utilization of light, and a larger amount of light applied to the document or object surface.

Two optical axes of the lens form an angle of 40°, and the normal to the document surface and one optical axis form an angle of 45° on attachment to the document reader.

As a result, in a line CCD for sensing the light reflected from the document surface, the sensed amount of noise light is smaller than the read light. Accordingly, the light source unit can have a higher S/N ratio.

The above effects can be achieved through optimization of the shape of the rod lens, and can be realized through a low-cost method.

It will be apparent to those skilled in the art that various modifications and variations can be made in the present invention without departing from the spirit or scope of the invention. Thus, it is intended that the present disclosure cover the modifications and variations of this invention provided they come within the scope of the appended claims and their equivalents. All related and conventional art references described above are hereby incorporated in their entirety by reference.

What is claimed is:

1. A light source unit configured to apply light to a surface of an object and to receive light reflected from the surface of the object in order to read the object, the light source unit comprising:
    a line light source having a longitudinal axis;
    a rod lens having a longitudinal axis substantially in parallel with the longitudinal axis of the line light source, the rod lens having a first optical-axis plane and a second optical-axis plane, the first optical-axis plane containing a plurality of optical axes passing through a first linear line focus group containing a plurality of first focuses, the second optical-axis plane containing a plurality of optical axes passing through a second linear line focus group containing a plurality of second focuses; and a linear reflector located on an opposite side of the rod lens as compared to the line light source and at a position crossing the second optical-axis plane of the rod lens, wherein the first linear line focus group and the second linear line focus group are located substantially at a position where the second optical-axis plane when reflected from the linear reflector crosses the first optical-axis plane.

2. The light source unit according to claim 1, wherein the first optical-axis plane and the second optical-axis plane when reflected from the linear reflector cross at an angle of 80-100°.

3. The light source unit according to claim 1, wherein the first linear line focus group is located at a distance of 2-5 mm from the second linear line focus group.

4. The light source unit according to claim 1, wherein the rod lens has surfaces on a side facing the line light source and an opposite side when sectioned along a plane normal to the longitudinal direction of the rod lens, the surfaces having shapes of composite curves when viewed in section normal to the longitudinal axis of the rod lens and including a plurality of continuous curves with different radii of curvature, the composite curves located on both sides of a third optical axis of the line light source passing through the rod lens, the composites curves being convex and expanding away from the line light source, wherein the composite curves have a link therebetween, which is a straight line in parallel with the third optical axis.

5. The light source unit according to claim 1, wherein the first optical-axis plane and the second optical-axis plane before reflection from the linear reflector form an angle of 40°.

6. The light source unit according to claim 1, wherein the line light source includes a plurality of white LEDs that are linearly arrayed.

7. The light source unit according to claim 1, further comprising an object reader and a contact glass, wherein the line light source is movably attached to the contact glass in a direction normal to the longitudinal direction of the line light source while the first optical-axis plane of the rod lens and the second optical-axis plane after being reflected from the linear reflector are each at an angle of 40-50° with respect to a plane normal to the contact glass.

8. The light source unit according to claim 1, wherein the light source unit is configured for use in reading documents.

9. A light source unit and reader configured to apply light to a surface of an object and to receive light reflected from the surface of the object in order to read the object, the light source unit and reader comprising:

a line light source having a longitudinal axis;

a rod lens having a longitudinal axis substantially in parallel with the longitudinal axis of the line light source, and having a first convex curved surface facing away from the line light source and having a first optical-axis, the rod lens having a second convex curved surface separated from the first convex curved surface by at least one of a linear link portion of the rod lens and a concave portion of the rod lens, the second convex curved surface having a second optical-axis, the first convex surface having a first focus, the second convex surface having a second focus; and a reflector having a longitudinal axis and located on an opposite side of the rod lens as compared to the line light source and at a position crossing the second optical-axis of the rod lens, wherein the first focus and the second focus are located substantially at a position where the second optical-axis when reflected from the reflector crosses the first optical-axis.

10. The light source unit and reader according to claim 9, wherein the first optical-axis and the second optical-axis after being reflected from the reflector cross at an angle of 80-100°.

11. The light source unit and reader according to claim 9, wherein the first focus is located at a distance of 2-5 mm from the second focus.

12. The light source unit and reader according to claim 9, wherein the rod lens has a receiving surface on a side facing the line light source and an opposite emitting side surface when sectioned along a plane normal to the longitudinal direction of the rod lens, the emitting side surface includes shapes of composite curves when viewed in section normal to the longitudinal axis of the rod lens, the composite curves including a plurality of continuous curves with different radii of curvature, at least a first of the composite curves being located on a first side of a third optical axis of the line light source which passes through the rod lens, the first of the composite curves being convex and expanding away from the line light source, and at least a second of the composite curves being located on a second side of the third optical axis of the line light source opposite to the first side, the second of the composite curves being convex and expanding away from the line light source, wherein the first and second composite curves have a link surface located therebetween, the link surface being a straight line in parallel with the third optical axis.

13. The light source unit and reader according to claim 9, wherein the first optical-axis and the second optical-axis form an angle of 40°.

14. The light source unit and reader according to claim 9, wherein the line light source includes a plurality of white LEDs that are linearly arrayed.

15. The light source unit and reader according to claim 9, further comprising:

an object reader and a contact glass, wherein the line light source is movably attached to the contact glass in a direction normal to the longitudinal direction of the line light source while the first optical-axis of the rod lens and the second optical-axis after being reflected from the linear reflector are each at an angle of 40-50° with respect to a plane normal to the contact glass.

16. The light source unit and reader according to claim 9, further comprising:

a contact glass configured for placement of the object thereon; and a carriage located adjacent and configured to move relative to the contact glass, wherein the line light source, rod lens, and reflector are located in and moveable with the carriage.

* * * * *